US008028181B2

(12) United States Patent
Jahagirdar et al.

(10) Patent No.: US 8,028,181 B2
(45) Date of Patent: Sep. 27, 2011

(54) PROCESSOR POWER CONSUMPTION CONTROL AND VOLTAGE DROP VIA MICRO-ARCHITECTURAL BANDWIDTH THROTTLING

(75) Inventors: Sanjeev Jahagirdar, Folsom, CA (US); Edward Gamsaragan, El Dorado Hills, CA (US); Scott E. Siers, Elk Grove, CA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 12/284,303

(22) Filed: Sep. 19, 2008

(65) Prior Publication Data

US 2010/0077232 A1 Mar. 25, 2010

(51) Int. Cl.
*G06F 1/00* (2006.01)
(52) U.S. Cl. ........................................ 713/320; 713/300
(58) Field of Classification Search .................. 713/300, 713/320
See application file for complete search history.

(56) References Cited

U.S. PATENT DOCUMENTS

| 6,931,559 | B2 | 8/2005 | Burns et al. | |
|---|---|---|---|---|
| 7,260,731 | B1 * | 8/2007 | Read et al. | 713/320 |
| 7,299,370 | B2 | 11/2007 | George | |
| 7,599,808 | B2 * | 10/2009 | Weekly | 702/64 |
| 7,836,326 | B2 * | 11/2010 | Shimada et al. | 713/600 |
| 2004/0158756 | A1 | 8/2004 | Totsuka et al. | |
| 2004/0215989 | A1 | 10/2004 | Kawano et al. | |
| 2008/0276236 | A1 * | 11/2008 | Branover et al. | 718/100 |

FOREIGN PATENT DOCUMENTS

| WO | 2010/033446 A2 | 3/2010 |
|---|---|---|
| WO | 2010/033446 A3 | 5/2010 |

OTHER PUBLICATIONS

International Search Report/Written Opinion for Patent Application No. PCT/US2009/056782, mailed Apr. 7, 2010, 10 pages.

* cited by examiner

*Primary Examiner* — Chun Cao
(74) *Attorney, Agent, or Firm* — Derek J. Reynolds (57) ABSTRACT

A method, device, and system are disclosed. In one embodiment the method includes supplying a processor with a first voltage. The method also includes allowing the processor to function within an enhanced processor halt state at the first voltage. The first voltage is a voltage below the lowest compatible voltage for the enhanced processor halt state. The method allows the processor to execute instructions upon waking from the enhanced processor halt state at the first voltage by throttling a maximum throughput rate of instructions being executed in the processor.

25 Claims, 3 Drawing Sheets

PROCESSOR POWER CONSUMPTION CONTROL AND VOLTAGE DROP VIA MICRO-ARCHITECTURAL BANDWIDTH THROTTLING

FIELD OF THE INVENTION

The invention relates to micro-architectural bandwidth throttling for specific processor power states.

BACKGROUND OF THE INVENTION

A modern processor, such as an Intel® architecture processor or another brand processor, generally has multiple power states available to allow for power conservation when the processor is not busy. Processors generally have a fully operational power state referred to as C0. C0 generally has a high frequency mode (HFM) and a low frequency mode (LFM). Another common processor power state is C1E. In the C1E state the processor is available for snoop servicing but does not execute or retire any instructions. Snoop servicing requires a certain voltage sufficient to keep the processor cache operational.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, device, and system for operating a processor in a C1E power state at a voltage lower than the C1E power state voltage level by implementing processor bandwidth throttling are disclosed.

A modern processor generally has multiple power states available to allow for power conservation when the processor is not busy. In many processors, one of those states includes the C0 state, which is a state at which the processor is fully operational. During normal operation, the processor operates in the C0 state in either a high frequency mode (HFM) or a low frequency mode (LFM). The processor is supplied with a different voltage in the HFM vs. the LFM, wherein the LFM voltage is generally a lower voltage than the HFM voltage.

Another processor power state is the C1E state, which requires the processor to be available for snoop servicing. In many embodiments, the C1E state may be referred to as an "enhanced processor halt state." The C1E state requires a lower supplied voltage to the processor relative to the C0 HFM state.

At the standard LFM voltage, a processor is capable of scheduling and retiring the maximum number of instructions per clock cycle. Generally, the C1E state utilizes the same voltage as the LFM voltage because upon waking up from the C1E state, the processor may immediately transition into a maximum execution and retirement rate. To lower the power consumption in the C1E state, a deep C1E voltage may be implemented, which is a lower voltage than the standard C1E (i.e. LFM) voltage. The deep C1E voltage is not compatible with maximum instruction scheduling and retirement rates. Thus, to maintain voltage compatibility with a potential scheduling and retirement rate upon exit of the C1E state at the deep C1E voltage, the processor may implement micro-architectural bandwidth throttling, such as throttling the instruction scheduling rate or the instruction retirement rate, immediately upon exiting the C1E state. Because throttling limits the bandwidth of instructions passing through the processor, the processor power consumption limits are also reduced.

When the processor exits the C1E state at the deep C1E voltage, two things occur. First, the voltage level will begin to ramp to the standard LFM voltage since that voltage is compatible with a maximum processor execution and retirement rate. Additionally, in the interim period of time after exiting the C1E state and prior to the voltage reaching the LFM voltage, the processor may implement a micro-architectural bandwidth throttling mechanism, which may lower the maximum power consumption possible, and thus lower the required voltage to at least the deep C1E voltage.

This allows the deep C1E voltage to be supplied to the processor during the C1E state, and maintains voltage compatibility upon exit of the C1E state while the voltage is initially ramping to the LFM voltage. The amount of the reduction in the voltage supply is processor and implementation specific. For example, as the throttling is increased, the greater the available reduction in the voltage.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
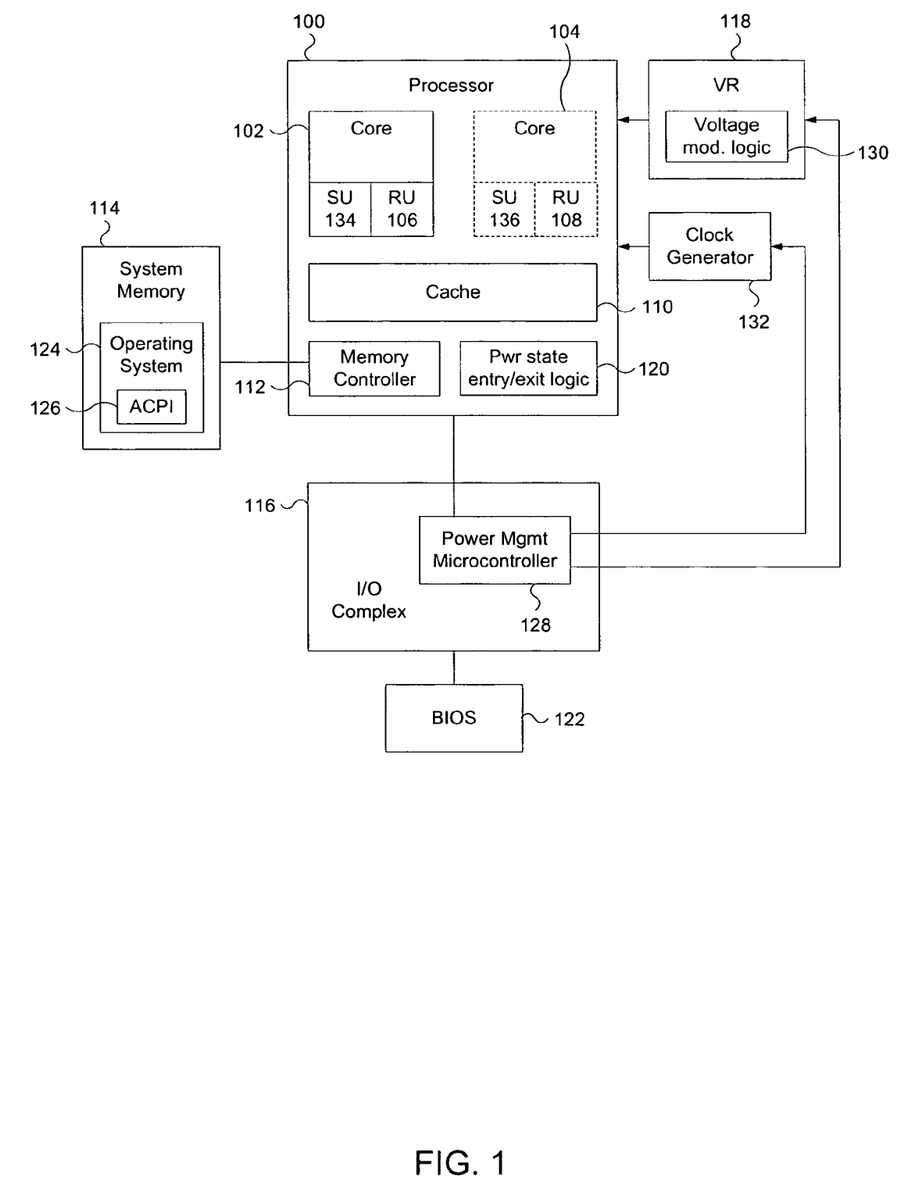
FIG. 1 describes an embodiment of a computer system capable of using micro-architectural bandwidth throttling to enable operation in an enhanced processor halt state at a supplied voltage level lower than compatible with the state.

FIG. 1 describes an embodiment of a computer system capable of using micro-architectural bandwidth throttling to enable operation upon the exit of an enhanced processor halt state at a supplied voltage level lower than compatible with the state.

In different embodiments, the computer system may be a desktop computer, a server computer, a laptop computer, a handheld electronic device, a television set top computer, an integrated computer within an appliance or vehicle, or any other type of conceivable computer system within the scope of the various embodiments described below.

In many embodiments, the computer system includes a processor 100. The processor may include a single core such as core 102, or have multiple cores, such as cores 102 and 104 (or more). A cache memory 106 also resides on the processor die. The cache memory 106 may include multiple levels of cache, such as a level 1 cache and a level 2 cache. Furthermore, when there are multiple cores in the processor, each of the different levels of cache memory 106 may be shared or there may be a cache memory per core in different embodiments.

In some embodiments, the processor 100 may be an Intel® architecture microprocessor. In some embodiments, the processor 100 may include Intel SpeedStep® technology or another power management-related technology that provides for two or more voltage/frequency operating points. In some embodiments, the processor 100 may be a different type of processor such as an embedded processor or a digital signal processor.

A micro-architectural throttling mechanism may take several forms. In some embodiments, the micro-architectural throttling mechanism may limit the retirement rate of instructions executed by the processor. In other embodiments, the micro-architectural throttling mechanism may limit the allocation of instructions sent to a scheduler, which schedules instructions to be executed. For example, a scheduler that schedules instructions may force one or more dead clock cycles where no instruction is scheduled between the clock cycles utilized to schedule instructions.

In some embodiments, the micro-architectural bandwidth throttling limits the scheduling and/or retirement of instructions in a reduced instruction set computer (RISC) architecture. In other embodiments, the micro-architectural bandwidth throttling limits the scheduling and/or retirement of instructions in a complex instruction set computer (CISC) architecture. In CISC embodiments, instructions being executed by the processor are broken down into one or more micro-architectural operations (uops). Uops are generally indivisible and are what make up the instruction pipeline of a CISC processor.

Therefore, in many RISC and CISC embodiments, the processor includes a scheduling unit to schedule instructions to be executed by the processor's execution unit and also a retirement unit to retire the instructions that have already been pushed through the execution unit. The power consumption of the processor is partly determined by the scheduling rate and retirement rate of the processor. Most processors have the capability to schedule and retire more than one instruction per clock cycle. For example, many processors can schedule and retire up to four instructions during each clock cycle.

Bandwidth throttling of the processor may occur if the core is limited to scheduling or retiring less than the maximum number of instructions per clock cycle. For example, if the retirement unit can normally retire four instructions per clock cycle and logic within the processor limits the retirement rate to one instruction per clock cycle, the processor is essentially being throttled, which leads to lower performance as well as a lower potential power dissipation.

Each core may include a scheduling unit (SU), such as SU 134 and SU 136 for cores 102 and 104, respectively. Additionally, each core may include a retirement unit (RU), such as RU 106 and RU 108 for cores 102 and 104, respectively.

The logic within a SU schedules instructions to be executed by the core. In a CISC architecture, the SU may schedule instructions in an out-of-order manner to speed up execution within the pipeline. Additionally, in a CISC architecture, the RU may include a re-order buffer (ROB). The ROB within the RU of a CISC architecture puts the uops back into an original program order after the uops have been executed (possibly out of order).

As stated above, most processors have the capability to both schedule and retire more than one instruction per core clock, for example, four instructions may be scheduled and retired during each core clock in many processors per core. Therefore, micro-architectural bandwidth throttling can occur if logic within the SU, the RU, or both limit the scheduling rate and/or the retirement rate of instructions to less than four instructions per core clock.

In some embodiments, throttling occurs when logic within the SU limits the rate of scheduling to one instruction per core clock instead of the capable maximum rate of four instructions per core clock. In other embodiments, throttling occurs when logic within the SU limits scheduling instructions to every other core clock instead of every core clock. Thus, if the maximum rate of scheduling is four instructions per clock, if only every other clock is available for scheduling purposes, the effective maximum scheduling rate is reduced to two instructions per core clock.

In other embodiments, throttling occurs when logic within the RU limits the rate of retiring to one instruction per core clock instead of the capable maximum rate of four instructions per core clock. Many other standard micro-architectural bandwidth throttling mechanisms may be implemented or a combination of mechanisms may be implemented. The result of any throttling mechanism is that the throughput of instructions over a period of time is limited to less than what the core is capable of producing. This creates less than optimal instruction flow bandwidth through a core, and therefore, the core will never reach a state during throttling that the maximum specified supply voltage is needed.

Thus, during micro-architectural bandwidth throttling, the supplied voltage to the core may be reduced. 100291 Additionally, the processor also has an integrated memory controller 112 in many embodiments. In other embodiments that are not shown, memory controller 112 is a discrete device or integrated into a bridge device or other system chip apart from the processor 100. The memory controller 112 is coupled through a processor-memory interconnect to system memory 114. The memory controller 112 enables the processor 100 and any other devices in the computer system to access system memory 114. In many embodiments, system memory 114 may comprise a form of random access memory (RAM) such as dynamic RAM (DRAM), flash memory, or another form of memory.

The processor also is coupled to a discrete input/output (I/O) complex 116 in many embodiments. In other embodiments that are not shown, the I/O complex may be integrated into the processor. The I/O complex 116 may include one or more integrated I/O host controllers (not shown) that allow I/O devices such as keyboards, mass storage devices, etc. to connect to the computer system.

The system also includes a voltage regulator (VR) 118, which is coupled to the processor 100. The VR 118 supplies a power operating voltage to the processor and may operate in accordance with a version of the Intel® Mobile Voltage Positioning (IMVP) specification such as the IMVP-6 specification. The VR 118 may include logic that is responsive to one or more signals to reduce voltage to the processor 100 to one or more low voltage states. The VR 118 logic may also ramp the voltage to the processor 100 back up again after exiting a low voltage state. Furthermore, in other embodiments that are not shown, the VR 118 may be integrated into the processor 100.

The processor 100 also includes power state entry and exit logic 120 to control entry into and exit from one or more voltage states. Each power state includes a specific voltage that is used as the power operating voltage fed to the processor from the VR 118. In certain embodiments, the processor may send a voltage value to the VR 118 using a voltage ID (VID) value. In other embodiments, the processor may send voltage values to the VR using information other than VIDs. The information sent to the VR is implementation specific as different platforms utilize different types of VRs, which accept different formats of voltage modification instructions/information.

In many embodiments that do utilize VIDs, a power state VID is paired with a specific processor operating frequency. Thus, in many embodiments, a power state table that stores voltage/frequency pairs is stored in the computer system. This table may be located within microcode in the processor 100, in storage within the I/O complex 116, in BIOS (basic input/output system) 122, or in other firmware in the system. In many embodiments, the power state table includes incremental voltage values in a linear fashion. For example, the first table entry may correspond with the lowest voltage amount and then subsequent entries may increment the voltage linearly by a uniform amount for each entry. In other embodiments, the first table entry may correspond with the highest voltage amount for the processor and subsequent entries may decrement the voltage linearly by a uniform amount for each entry.

In many embodiments, when the computer system is operational, an operating system 124 is loaded into system memory 114. The operating system may include code to support an Advanced Configuration and Power Interface (ACPI) 126. Using this code, the operating system may have access to the power state table and command the ACPI interface to enter and exit different power states.

The I/O Complex 116 also includes a power management microcontroller 128 in many embodiments. The power management microcontroller 128 includes state control logic that may control transitions between power management states and normal operational states that are associated with the processor 100. Each power management state has at least one particular voltage level and frequency combination. The voltage level is the voltage level supplied to the processor and the frequency is the frequency at which the processor operates. The power management microcontroller 128 can provide information to voltage modification logic 130 within the VR 118 to set the voltage supplied to the processor 100. The power management microcontroller 128 can also provide information to a clock generator circuit 132 to provide a clock signal to the processor 100. In many embodiments, the clock generator circuit 132 is a phase locked loop (PLL). In many embodiments, power state entry/exit logic 120 also can control modification of the frequency within the processor for different power states. There are generally multiple power management states.

Embodiments are hereafter described to transition the processor 100 from a fully operational C0 power state down to a C1E power state and back again utilizing micro-architectural bandwidth throttling during the deep C1E voltage state and during transitions between the deep C1E voltage state and the LFM voltage state.

At a time when the processor is running in the C0 power state, an ACPI or other command from the operating system or from elsewhere in the computer system may be sent to the power management microcontroller 128 to bring the processor 100 down to the C1E state. In some embodiments, if the processor 100 is operating at the HFM frequency, it is first brought down to the LFM frequency/voltage pair, which is a lower supported frequency and corresponding voltage. To transition the processor to the LFM frequency, power state entry/exit logic 120 may modify the frequency. In alternative embodiments, the clock generator 132 may externally modify the clock supplied to the processor 100, which will additionally modify the frequency of the processor 100.

When the frequency is changed to the LFM frequency, in many embodiments, the power management microcontroller 128 sends voltage information, such as a VID to the VR 118 to lower the voltage to the LFM voltage level. The LFM voltage level is the same voltage that the processor utilizes when in a standard C1E state.

In some embodiments, once the frequency and voltage are at the LFM level, the power state entry/exit logic 120 may enter the processor into the C1E state. As mentioned above, the C1E state requires the processor to be available for snoop servicing but the processor is not executing any instructions in this state.

Upon entering the C1E state, the power management microcontroller 128 may send a command to the voltage modification logic 130 within VR 118 to lower the voltage below the voltage paired to the C1E/LFM frequency. In some embodiments, this voltage level can be brought down by subtracting a delta VID value from the standard LFM/C1E VID value. Thus, the resulting lower VID value can be sent to the VR 118 to lower the voltage. This voltage level, which is reduced below the standard LFM/C1E voltage level may be referred to as a deep C1E voltage level. The amount the voltage supplied to the processor can be lowered may vary in different embodiments (with different processors).

In many embodiments, the micro-architectural bandwidth throttling mechanism may be engaged at the same time the deep C1E voltage information is sent to the VR 118. In many embodiments, the signal that instructs the VR 118 to lower the supplied voltage to the core(s) is the same signal that may be sent to the processor to instruct the core(s) engage the throttling mechanism. Thus, the micro-architectural bandwidth throttling mechanism may be engaged in the C1E state even though the processor is not executing instructions. This allows the processor to quickly exit the C1E state and return to executing instructions in the C0 LFM state without waiting for the voltage to finishing ramping from the deep C1E voltage to the standard LFM/C1E voltage level.

In other words, the throttling mechanism is utilized to throttle the processor instruction throughput during portions of the LFM state in which the supplied voltage to the processor is below the LFM/C1E voltage level. Specifically, when the processor comes out of the C1E state into the LFM state, there is a finite amount of time it would require the VR 118 to ramp the voltage from the deep C1E voltage level to the LFM/C1E voltage level. Thus, during this period of time, the processor core(s) are allowed to execute instructions as they would in the C0 LFM state even though the voltage is lower than specified for the LFM state because the throttling mechanism restricts the processor from running a stressed workload requiring the LFM voltage level.

Therefore, in many embodiments, at a time when the processor is running in the C1E power state at the deep C1E voltage level, an interrupt to wake the processor to the fully operational C0 power state may be sent to the power management microcontroller 128. In many embodiments, once the interrupt is received the core(s) will begin a wakeup procedure and will begin servicing standard interrupts at the LFM frequency. At the beginning of the transition from C1E to C0, the power management microcontroller 128 may send information to the VR 118 (and voltage modification logic 130 within the VR 118) to begin to ramp the voltage from the deep C1E voltage level to the standard LFM/C1E voltage level.

In some embodiments, the micro-architectural throttling continues until the voltage level reaches the LFM voltage level. In these embodiments, the throttling ceases once the LFM voltage level has been reached. In other embodiments, the processor comes out of the C1E state and proceeds directly to the C0 HFM state. In these embodiments, the throttling continues at least until the voltage level reaches the LFM voltage level during the voltage ramp. In these embodiments, once the voltage level has risen to the standard LFM voltage level, the throttling ceases for the remainder of the voltage ramp to the C0 HFM voltage.

Figure 2:
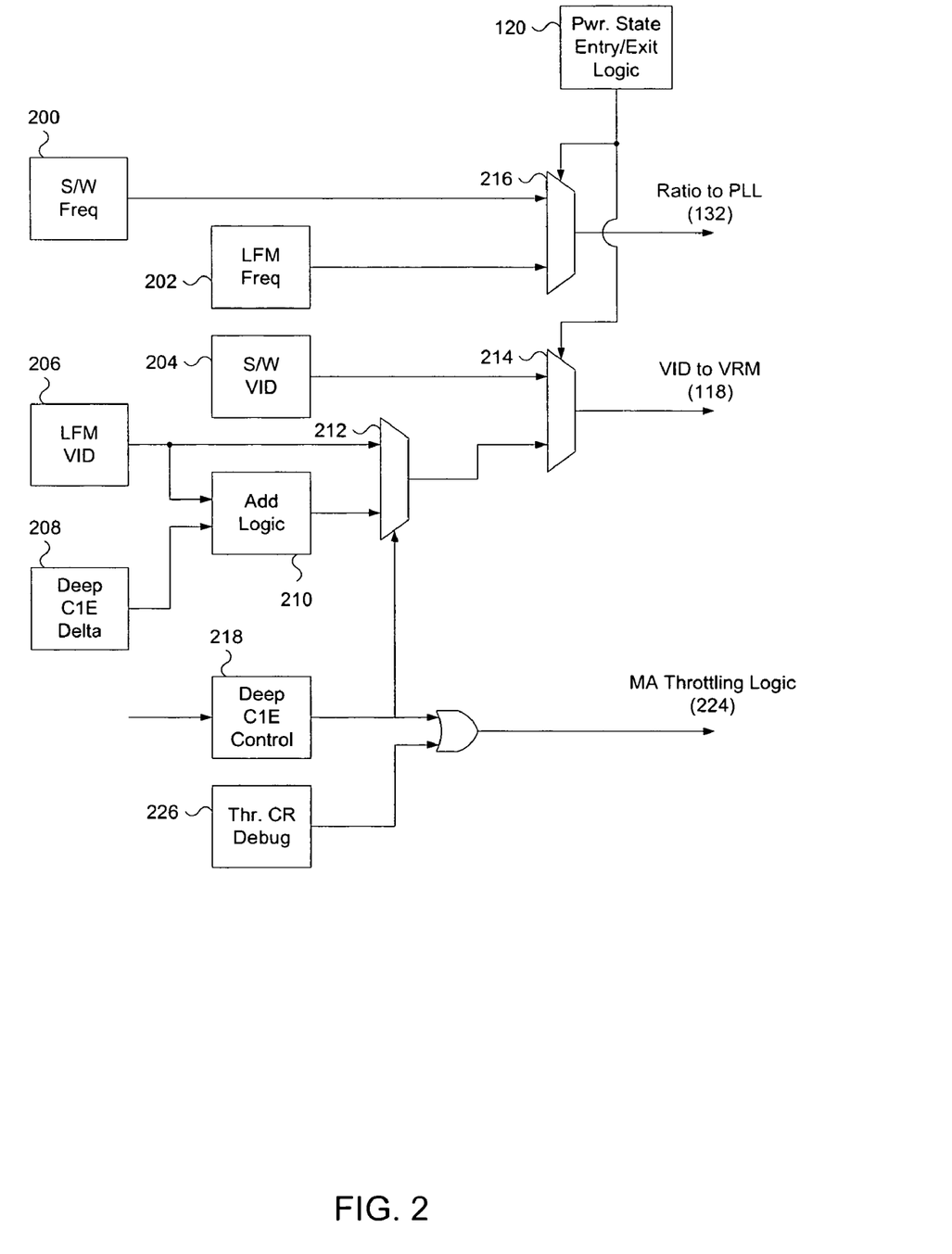
FIG. 2 describes an embodiment of power management logic utilized to implement a deep C1E voltage.

FIG. 2 describes an embodiment of power management logic utilized to implement a deep C1E voltage. In many embodiments, values are input into the logic. The values, which in some embodiments include the software frequency value 200, the LFM frequency value 202, the software voltage value 204, and the LFM voltage value 206 are values originating from one or more types of memory storage locations that store these values. In some embodiments, these values may be stored within registers located in the processor or elsewhere within the computer system. In other embodiments, the values are stored in a non-volatile memory associated with the BIOS, in system memory, or in another storage location within the computer system. In many embodiments, the values may comprise representative values that correspond to locations in one or more tables stored within the computer system in one or more storage locations.

For example, the frequency value may correspond to a row within a frequency value table. The table may store the entire set of frequencies the processor is capable of running. Table 1 illustrates an embodiment of a partial frequency table.

TABLE 1

Processor frequency value table.

| Frequency Value (8-bit value) | Corresponding Processor Frequency |
| --- | --- |
| 00000000b | 0 GHz |
| 00000010b | 3.0 GHz |
| 00000100b | 2.9 GHz |
| 00000110b | 2.8 GHz |
| 00001000b | 2.7 GHz |
| 00001010b | 2.6 GHz |
| 00001100b | 2.5 GHz |
| 00001110b | 2.4 GHz |
| 00010000b | 2.3 GHz |
| 00010010b | 2.2 GHz |
| 00010100b | 2.1 GHz |
| 00010110b | 2.0 GHz |
| 00011000b | 1.9 GHz |

This table begins with the frequency at 0 Gigaherz (GHz5 corresponding to a frequency value of all zeros. After that, the table shows that for each increment of an 8-bit binary frequency value, the corresponding frequency decreases by 100 Megaherz (MHz), starting at 3.0 GHz as the high frequency. Although the table only shows processor frequency values decreasing to 1.9 GHz, a full table may continue down, using further increments in the binary frequency value and corresponding further decrements in the processor frequency. Again, this table may be located in any location within the computer system that has storage space sufficient to store the table. Thus, the software frequency value 200, which in many embodiments refers to the current value that software within the system is requesting the processor voltage to be set at, may include an 8-bit frequency value that corresponds to a row in a frequency value table, such as Table 1.

In another example, the voltage values may correspond to rows within a voltage table that store the entire set of voltage levels capable of being supplied to the processor. Table 2 illustrates an embodiment of a partial voltage value table as implemented using particular VID values.

TABLE 2

Voltage/VID value table.

| VID Value (8-bit value) | Corresponding Voltage |
| --- | --- |
| 00000000b | OFF |
| 00000010b | 1.6 |
| 00000100b | 1.5875 |
| 00000110b | 1.575 |
| 00001000b | 1.5625 |
| 00001010b | 1.55 |
| 00001100b | 1.5375 |
| 00001110b | 1.525 |
| 00010000b | 1.5125 |
| 00010010b | 1.5 |
| 00010100b | 1.4875 |
| 00010110b | 1.475 |
| 00011000b | 1.4625 |

This table begins with the voltage shut off when the VID value is all zeros. After that, the table shows that for each increment of an 8-bit binary VID value, the corresponding voltage decreases by 0.0125V, starting at 1.6V as the high voltage. Although the table only shows voltage supply values decreasing to 1.4625V, a full table may continue down, using further increments in the binary value and corresponding further decrements in the supplied voltage. Again, this table may be located in any location within the computer system that has storage space sufficient to store the table. Thus, the software VID value 204, which in many embodiments refers to the current value that software within the system is requesting the processor voltage to be set at, may include an 8-bit VID value that corresponds to a row in a VID table, such as Table 1.

The LFM frequency value 202 and LFM VID value 206 correspond to the processor frequency and supplied voltage to the processor utilized when the processor is in the LFM. Thus, the LFM voltage and frequency values may be preset values to be utilized when power management logic decides to bring the processor into the LFM. In many embodiments, a Deep C1E Delta value 208 is also provided to the power management logic. The Deep C1E Delta value 208 comprises a difference between a standard LFM VID and the lower voltage corresponding to the Deep C1E VID. For example, the LFM VID may be 00001010b, which corresponds to 1.55V in Table 2. The Deep C1E voltage value may be 00010110b, which corresponds to 1.475V in Table 2.Thus, the Deep C1E Delta value 208 would correspond to the delta between those two values, which is 00001100b (i.e. 00001010b+00001100b=00010110b).

The LFM VID value 206 and Deep C1E Delta value 208 are input into the Add Logic 210, which adds the two values together. The result is the value in Table 2 that corresponds to the Deep C1E VID value.

In many embodiments, power management logic includes several gates to determine which of two values will be fed to various components within the computer system. Gate 212 can switch between whether the LFM VID value 206 or the computed Deep C1E VID value is sent to gate 214. Gate 214, in turn, can switch between whether to send the software VID value 204 or the result from gate 212 VID value to the VR 118. Finally, gate 216 can switch between whether to send the software frequency value 200 or the LFM frequency value 202 to the PLL 132 for ratio modification.

The determination of which inputs to gates 214 and 216 are output is made by power state entry/exit logic 120. The power state entry/exit logic 120 can switch between a software determined VID value and frequency value vs. a LFM VID value and frequency value. In many embodiments, a Deep C1E Control value 218 can determine whether the Deep C1E VID value will be sent to gate 212 instead of the LFM VID value 206. In some embodiments, the Deep C1E Control value 218 may be located within a control register or other storage location in the processor or elsewhere within the computer system. In different embodiments, the Deep C1E Control value 218 may be located within the power management microcontroller (128 in FIG. 1), within the power state entry/exit logic 120, in a location in system memory 114, or elsewhere.

In many embodiments, the Deep C1E Control value 218 also provides micro-architectural throttling logic within the core with an input value that dictates whether the throttling logic within the core engages throttling of the instructions pushed through the core. In some embodiments, the Deep C1E Control value 218 is a single bit. For example, if the Deep C1E Control value 218 is "1" that would indicate that the Deep C1E power management is active. This "1" would be sent to gate 212. Gate 212, in turn, would allow the calculated Deep C1E VID value from Add Logic 210 to be sent to gate 214 because it receives the control "1". The Deep C1E Control value 218 of "1" also is sent to the micro-architectural throttling logic, which engages the throttling mechanism because of the "1" that is received. On the other hand, if the Deep C1E Control value 218 is "0" that would indicate that the Deep C1E power management is inactive. This "0" would be sent to gate 212. Gate 212, in turn, would allow the LFM VID value to be sent to gate 214 because it receives the control "0". The Deep C1E Control value 218 of "0" also is sent to the micro-architectural throttling logic, which does not engage the throttling mechanism because of the "0" that is received.

In many embodiments, the micro-architectural bandwidth throttling logic 224 includes a timer that starts when the Deep C1E power management is deactivated. The throttling logic may wait until the timer reaches an end prior to disengaging the throttling mechanism. This timer may coincide with the standard length of time the voltage would take to ramp from the deep C1E voltage level to the LFM voltage level. In other embodiments, logic within the core or within the VR may inform the micro-architectural bandwidth throttling logic when the voltage supplied to the processor has reached the LFM voltage during the voltage ramp from the deep C1E voltage level. This information given to the throttling logic would confirm that the voltage supplied to the core(s) is at least at the LFM voltage level. Once the throttling logic confirms the LFM voltage level has been reached due to this information, the throttling logic may then disengage the throttling mechanism.

Additionally, in many embodiments the Deep C1E Control value 218 is or'd with a throttling debug control register 226. The debug register may also implement micro-architectural bandwidth throttling. This register would allow the core to throttle the instruction throughput rate without causing a change in the VID sent to the VR 118.

Figure 3:
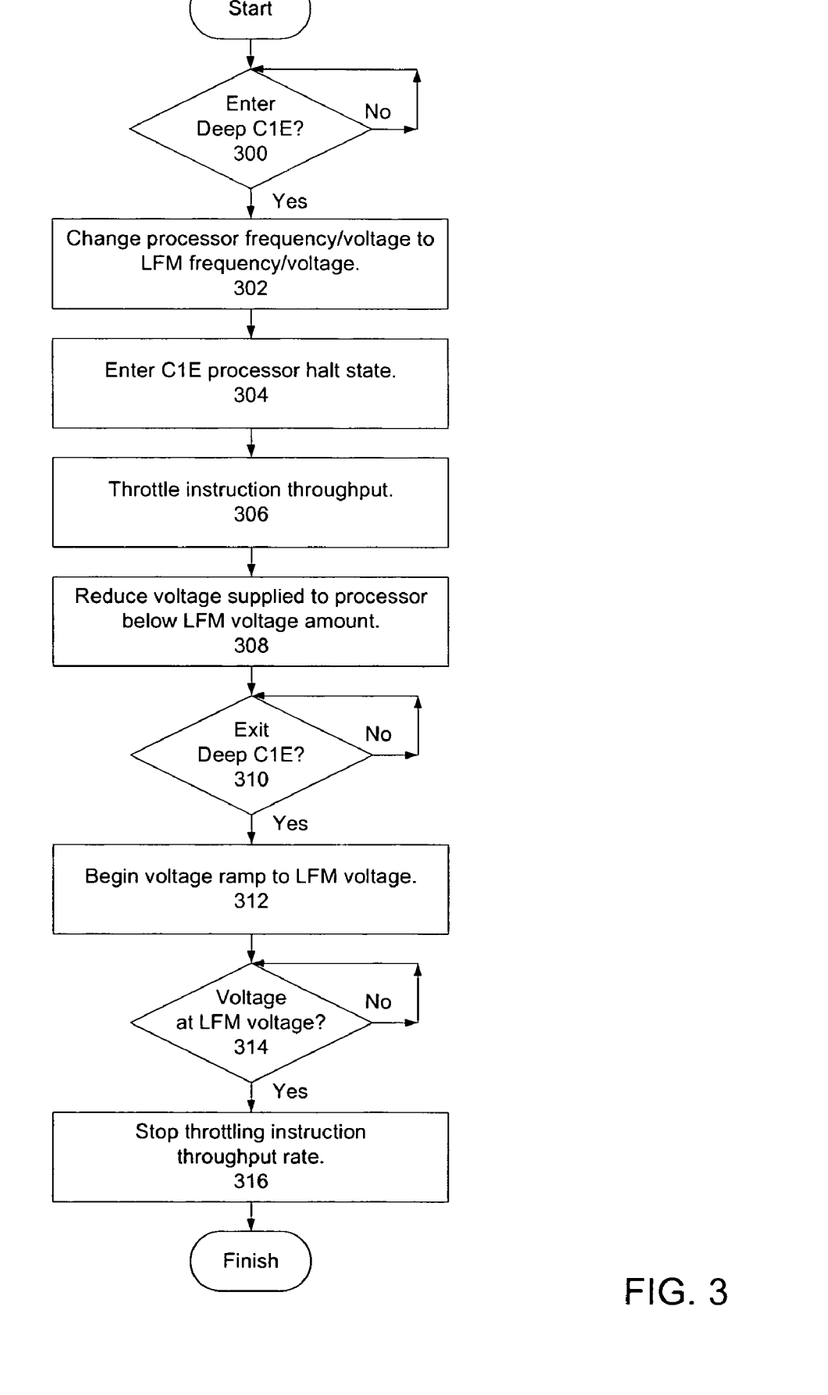
FIG. 3 is a flow diagram of an embodiment of a process to enter and exit a Deep C1E processor power management state.

FIG. 3 is a flow diagram of an embodiment of a process to enter and exit a Deep C1E processor power management state. The process is performed by processing logic, which may comprise hardware, software, or a combination of both. Additionally, in different embodiments, processing logic may be located within the processor, within an I/O complex apart from the processor, within system memory, or elsewhere in the computer system. Furthermore, the processing logic performing the blocks within the flow diagram may be located in more than one of those locations. The process begins by processing logic determining whether there is a command, instruction, or other piece of information that specifies the processor should enter a Deep C1E state (processing block 300). The Deep C1E state is a processor power management state, as described above in regard to FIGS. 1 and 2, that allows the processor to operate in the C1E state ("enhanced processor halt state") with a supplied voltage that is below the normal specified voltage for the C1E state.

In the embodiment of the process as shown in FIG. 3, the processor begins the process fully operational in the C0 state. Returning to processing block 300, if there is no indication to enter the Deep C1E state, the processor continues to function in the C0 state and processing block 300 again checks to see if an indication to enter the Deep C1E state has arrived. In some embodiments, an interrupt informs processing logic to enter the Deep C1E state.

If there is an indication to enter the Deep C1E state, processing logic changes the processor frequency to the LFM frequency and voltage (processing block 302). This occurs when the processor had been functioning at the HFM frequency and voltage in the C0 state.

Once the LFM frequency and voltage have been attained, then processing logic causes the processor to enter the C1E processor state (processing block 304). Once in the C1E processor state, processing logic begins throttling the instruction throughput through the processor by using one or more throttling mechanisms discussed above (e.g. instruction scheduling rate, instruction retirement rate, etc.) (processing logic 306). Though the throttled instruction throughput rate is a lower throughput rate per clock than the unthrottled throughput rate, the specific instruction throughput rates in the throttled and unthrottled modes are implementation specific.

After the instruction throughput rate has been throttled, then processing logic reduces the voltage supplied to the processor below the LFM voltage amount (processing logic 308). This change in voltage may be based on a set delta amount that is added to (or subtracted from—depending on voltage table implementation) the LFM voltage value to obtain the new, lower voltage value. The new voltage value is sent to the VR supplying the processor, and processing logic within the VR lowers the supplied voltage to the new voltage amount.

At this point, the processor is operating in the Deep C1E state because the processor frequency is set at the LFM (i.e. C1E) frequency, the voltage being supplied to the processor is at the deep C1E voltage level.

At a certain point in time after the processor fully enters the Deep C1E state, an interrupt may be sent to have the processor exit the Deep C1E state. In many embodiments, the interrupt requires the processor to return to at least the C0 LFM state.

Processing logic waits for the interrupt and determines whether the interrupt requires an exit from Deep C1E (processing block 310). If not, then processing logic returns and checks again for an exit event from Deep C1E at block 310. Otherwise, if an interrupt to exit Deep C1E arrives, then processing logic changes the voltage value supplied to the processor to the LFM voltage value. This voltage value is sent to the VR which begins ramping the voltage to the LFM voltage (processing block 312). When an interrupt arrives at the processor to exit the Deep C1E state, the processor may begin servicing standard interrupts. Processing logic then checks to see if the voltage supplied to the processor has risen to the LFM voltage amount (processing block 314). If not, then processing logic continues to check to see if the LFM voltage amount has been reached at block 314. Processing logic stops throttling the instruction throughput rate in the processor (processing block 316) when the LFM voltage has been reached and the process is finished.

In another embodiment not pictured, an additional block 316 may further ramp the voltage and frequency to their HFM levels.

Although the embodiments described herein focus on the C1E state to implement an instruction throughput rate throttling mechanism to allow for a decrease in the supplied voltage level in the state, in many additional embodiments the throttling mechanism may be employed for lowering the voltage of a processor state other than the C1E state (i.e. the "enhanced processor halt state").

Thus, embodiments of a method, device, and system for operating a processor in a C1E power state at a voltage lower than the C1E power state voltage level by implementing processor bandwidth throttling are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
supplying a processor with a first voltage, the first voltage being below a second voltage, the second voltage being the lowest compatible voltage for an enhanced processor halt state;
allowing the processor to execute instructions upon waking from the enhanced processor halt state at the first voltage by throttling a maximum throughput rate of instructions being executed in the processor.

2. The method of claim 1, further comprising:
entering the processor into the enhanced processor halt state by:
transitioning the processor to a first frequency of a low frequency mode and to the second voltage, wherein the second voltage is associated with the low frequency mode; and
further transitioning the processor to first voltage and simultaneously implementing the instruction throughput rate throttling.

3. The method of claim 2, further comprising:
receiving a processor interrupt request while the processor is in the enhanced processor halt state, the request requiring the processor to exit the enhanced processor halt state to service the request; and
servicing the interrupt at the first voltage.

4. The method of claim 3, further comprising:
exiting the processor out of the enhanced processor halt state by:
ramping the voltage supplied to the processor from the first voltage to the second voltage while continuing to throttle the instruction throughput rate; and
disabling the instruction throughput rate throttling when the voltage supplied to the processor reaches the second voltage.

5. The method of claim 3, further comprising:
exiting the processor out of the enhanced processor halt state by:
ramping the voltage supplied to the processor from the first voltage to the second voltage while continuing to throttle the instruction throughput rate;
disabling the instruction throughput rate throttling when the voltage supplied to the processor reaches the second voltage;
once the instruction throughput rate throttling has been disabled, ramping the voltage supplied to the processor from the second voltage to a third voltage, the third voltage being a higher voltage than the second voltage and being associated with a higher frequency mode; and
transitioning the processor to a second frequency associated with the higher frequency mode when the voltage supplied to the processor reaches the third voltage.

6. The method of claim 4, further comprising:
servicing the interrupt during the voltage ramp when the instruction throughput rate is being throttled.

7. The method of claim 1, wherein the processor is capable of retiring up to a first number of instructions per cycle, and wherein the processor is limited to retiring less than the first number of instructions per cycle during the instruction throughput rate throttling.

8. The method of claim 1, wherein the processor is available for snoop servicing during the enhanced processor halt state.

9. The method of claim 1, wherein the enhanced processor halt state is the C1E power state.

10. A device, comprising:
processor power management circuitry to:
supply a processor with a first voltage, the first voltage being below a second voltage, the second voltage being the lowest compatible voltage for an enhanced processor halt state;
allow the processor to execute instructions upon waking from the enhanced processor halt state at the first voltage by throttling a maximum throughput rate of instructions being executed in the processor.

11. The device of claim 10, wherein the processor power management circuitry is further operable to:
transition the processor to a first frequency of a low frequency mode and to the second voltage, wherein the second voltage is associated with the low frequency mode; and
further transition the processor to the first voltage and simultaneously implement the instruction throughput rate throttling.

12. The device of claim 11, wherein the processor power management circuitry is further operable to:
receive a processor interrupt request while the processor is in the enhanced processor halt state, the request requiring the processor to exit the enhanced processor halt state to service the request; and
cause the processor to service the interrupt at the first voltage.

13. The device of claim 12, wherein the processor power management circuitry is further operable to:
ramp the voltage supplied to the processor from the first voltage to the second voltage while continuing to throttle the instruction throughput rate; and
disable the instruction throughput rate throttling when the voltage supplied to the processor reaches the second voltage.

14. The device of claim 12, wherein the processor power management circuitry is further operable to:
ramp the voltage supplied to the processor from the first voltage to the second voltage while continuing to throttle the instruction throughput rate;
disable the instruction throughput rate throttling when the voltage supplied to the processor reaches the second voltage;

once the instruction throughput rate throttling has been disabled, ramp the voltage supplied to the processor from the second voltage to a third voltage, the third voltage being a higher voltage than the second voltage and being associated with a higher frequency mode; and transition the processor to a second frequency associated with the higher frequency mode when the voltage supplied to the processor reaches the third voltage.

15. The device of claim 13, wherein the processor is further operable to:

service the interrupt during the voltage ramp when the processor's instruction throughput rate is being throttled.

16. The device of claim 10, wherein the processor is capable of retiring up to a first number of instructions per cycle, and wherein the processor is limited to retiring less than the first number of instructions per cycle during the instruction throughput rate throttling.

17. The device of claim 10, wherein the processor is available for snoop servicing during the enhanced processor halt state.

18. The device of claim 10, wherein the enhanced processor halt state is the C1E power state.

19. A system, comprising:
a multi-core processor;
a voltage regulator; and
processor power management circuitry to:
cause the voltage regulator to supply the processor with a first voltage, the first voltage being below a second voltage, the second voltage being the lowest compatible voltage for an enhanced processor halt state;
allow the processor to execute instructions upon waking from the enhanced processor halt state at the first voltage by throttling a maximum throughput rate of instructions being executed in the processor.

20. The device of claim 19, wherein the processor power management circuitry is further operable to:
transition the processor to a first frequency of a low frequency mode and to the second voltage, wherein the second voltage is associated with the low frequency mode; and
further transition the processor to the first voltage and simultaneously implement the instruction throughput rate throttling.

21. The device of claim 20, wherein the processor power management circuitry is further operable to:
receive a processor interrupt request while the processor is in the enhanced processor halt state, the request requiring the processor to exit the enhanced processor halt state to service the request; and
cause the processor to service the interrupt at the first voltage.

22. The device of claim 21, wherein the processor power management circuitry is further operable to:
ramp the voltage supplied to the processor from the first voltage to the second voltage while continuing to throttle the instruction throughput rate; and
disable the instruction throughput rate throttling when the voltage supplied to the processor reaches the second voltage.

23. The device of claim 21, wherein the processor power management circuitry is further operable to:
ramp the voltage supplied to the processor from the first voltage to the second voltage while continuing to throttle the instruction throughput rate;
disable the instruction throughput rate throttling when the voltage supplied to the processor reaches the second voltage;
once the instruction throughput rate throttling has been disabled, ramp the voltage supplied to the processor from the second voltage to a third voltage, the third voltage being a higher voltage than the second voltage and being associated with a higher frequency mode; and
transition the processor to a second frequency associated with the higher frequency mode when the voltage supplied to the processor reaches the third voltage.

24. The system of claim 22, wherein the processor is capable of retiring up to a first number of instructions per cycle, and wherein the processor is limited to retiring less than the first number of instructions per cycle during the instruction throughput rate throttling.

25. The system of claim 19, wherein the enhanced processor halt state is the C1E power state.

* * * * *